(12) United States Patent
Cunningham

(10) Patent No.: US 6,293,517 B1
(45) Date of Patent: Sep. 25, 2001

(54) BALL VALVE HAVING CONVEX SEAT

(75) Inventor: James A. Cunningham, St. Mary Parish, LA (US)

(73) Assignees: John D. McKnight, New Iberia, LA (US); Brent H. McKnight, Corpus Christi, TX (US)

( * ) Notice: Subject to any disclaimer, the term of this patent is extended or adjusted under 35 U.S.C. 154(b) by 0 days.

(21) Appl. No.: 09/514,892

(22) Filed: Feb. 28, 2000

(51) Int. Cl.[7] ................. F16K 5/06; F16K 5/00; E21B 34/14
(52) U.S. Cl. ............. 251/315.02; 166/330; 251/314; 251/317
(58) Field of Search .............. 166/330; 257/315.02, 257/315.03, 314, 317

(56) References Cited

U.S. PATENT DOCUMENTS

| | | |
|---|---|---|
| 2,932,311 | 4/1960 | Scherer . |
| 2,988,109 | 6/1961 | Komrosky . |
| 3,077,895 | 2/1963 | Vickery . |
| 3,195,857 | 7/1965 | Shafer . |
| 3,211,421 | 10/1965 | Johnson . |
| 3,272,472 * | 9/1966 | Goldman .................. 251/315 |
| 3,380,709 | 4/1968 | Scaramucci . |
| 3,386,461 | 6/1968 | Fisher . |
| 3,556,471 * | 1/1971 | Paul, Jr. .................. 251/172 |
| 3,610,575 | 10/1971 | Yoneda . |
| 3,705,707 * | 12/1972 | Scaramucci ................ 251/84 |
| 3,888,460 * | 6/1975 | Sigmon .................. 251/315 |
| 4,505,294 * | 3/1985 | Walter .................... 137/241 |
| 4,662,392 * | 5/1987 | Vadasz ................ 137/533.11 |
| 4,813,649 | 3/1989 | Takeda . |
| 5,632,294 | 5/1997 | Benton . |
| 5,829,735 * | 11/1998 | Ikeda .................... 251/368 |

* cited by examiner

Primary Examiner—Kevin Shaver
Assistant Examiner—D A Bonderer
(74) Attorney, Agent, or Firm—G. Turer Moller

(57) ABSTRACT

A valve includes a valve ball and a convex metal valve seat ring that abut along a circle in a metal-to-metal seal. At very high contact forces, the valve ball and/or the valve seat elastically deform to increase the contact area between them and thereby lower the contact pressures applied to the valve ball and valve seat. The valve ball and valve seat are made of materials that do not pressure weld under a wide range of contact pressures. In one embodiment, the valve ball is a stainless steel alloy having a hardness of at least Rockwell 44C and the valve seat is Stellite having a hardness of at least Rockwell 50C. In another embodiment, the valve ball and seat ring are steel alloys having hardnesses above Rockwell 50C.

25 Claims, 1 Drawing Sheet

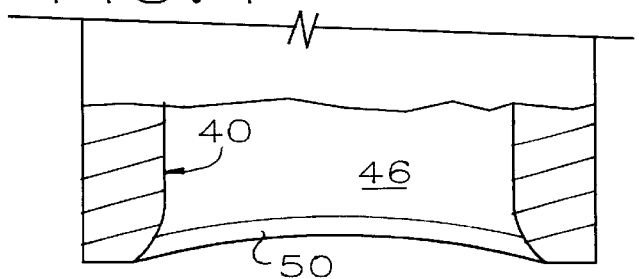
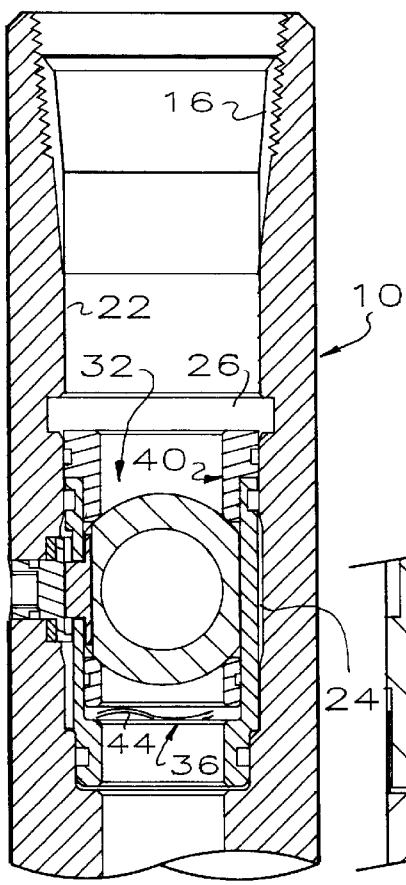
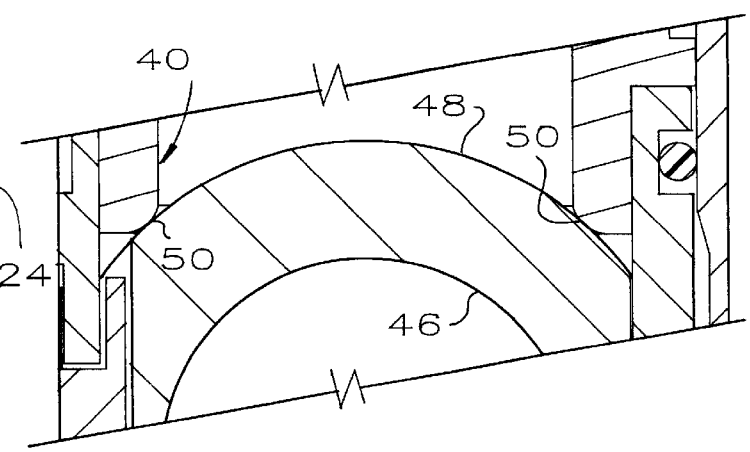
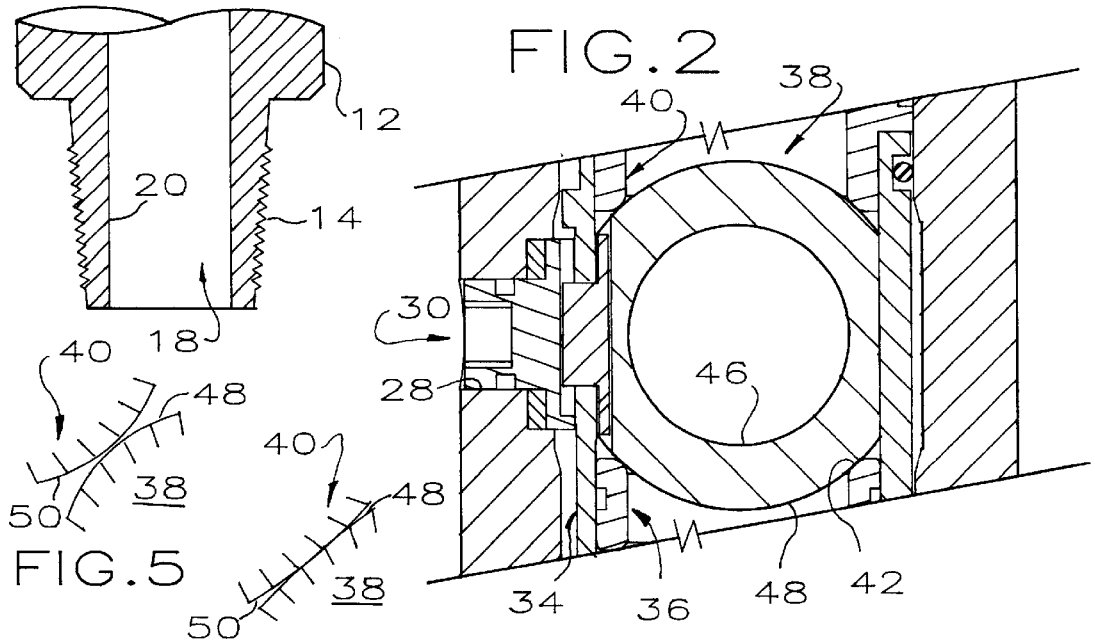

BALL VALVE HAVING CONVEX SEAT

This invention relates to a ball valve and, more particularly, to a ball valve having a convex seat providing a metal-to-metal seal with a valve ball.

BACKGROUND OF THE INVENTION

Metal-to-metal seals are very desirable in high pressure valves which are subjected to erosion, such as in kelly valves used to control blow outs in a drill string. A typical design for a high pressure valve of this type uses a spherical valve ball sealing against a valve seat which is concave in the sealing area. As can be imagined, these type valves must be made to close tolerances because they will not otherwise seal.

There are several factors that are pertinent in a valve ball—concave seat arrangement: (1) the roundness of the ball, (2) the radius matching between the ball and seat and (3) the nature of the surface finish. The roundness of the ball is also related to the problem of rotating the ball on its centerline. It will be appreciated that if the ball is perfectly round, it has an infinite number of centerlines and can be rotated about any of them. If the ball is quite out of round, it must be rotated substantially only on one of its centerlines, e.g. if the valve ball is football shaped, it can only be rotated on a small number of axes, probably only two.

With valve ball—concave seat arrangements having acceptable metal-to-metal seals, the ball roundness must be in the range of + or –0.0005" and the radius matching must be nearly perfect. Tolerances in this range are beyond the capability of state of the art metal cutting machinery such as computer controlled machining centers. Thus, these type valves are presently made by machining the ball and valve seat to as close a tolerance as possible and the parts are then lapped.

Lapping is a machining operation in which the parts are placed in fixtures and abutted together so they can be moved in the same manner as in use. An abrasive paste is applied to the parts and the parts are then rubbed together. The parts are rubbed together until the metal is worn off one or both parts to an extent where the parts meet the desired tolerance. This is a lengthy and expensive process so high pressure ball valves with metal-to-metal seals are expensive. When the time comes to rebuild a valve, one must replace the valve ball and the seat because each valve ball is made to fit its seat. Thus, modern high pressure metal-to-metal sealed ball valves are not mass produced if that term means that parts of identical devices are interchangeable.

Whether a valve ball has been lapped can be determined by examining it under magnification. Machining produces arcuate striations that are visible under magnification. When a valve ball is lapped, the visible striations are smaller and are typically cross-hatched. Interestingly, coating a valve ball does not disguise imperfections in the underlying surface, it magnifies them. Thus, inspection of a coated or uncoated valve ball under magnification shows whether it is lapped or untapped.

A disclosure of a ball valve having a metal convex valve seat is found in U.S. Pat. No. 3,888,460. Other disclosures of interest are found in U.S. Pat. Nos. 2,932,311; 2,988,109; 3,077,895; 3,185,857; 3,211,421; 3,272,472; 3,380,709; 3,386,461; 3,556,471; 3,610,575; 3,705,707; 4,813,649 and 5,632,294.

SUMMARY OF THE INVENTION

In this invention, a high pressure ball valve includes a metal convex valve seat. The valve ball and valve seat are made by conventional machining techniques which provide tolerances that are close enough to avoid having to lap the valve ball and seat. This allows the manufacture of low cost valve balls and valve seats that are capable of making satisfactory metal-to-metal seals.

Because of the small contact area between a valve ball and a convex seat, the calculated contact pressure between the ball and seat is very large compared to the calculated contact pressure concave seats. If the calculated contact pressures were actually achieved in practice, large valves subjected to high pressures would show plastic deformation of the valve ball or valve seat. Prototypes of this invention fail to show such plastic deformation. Much lower calculated contact pressures in valve ball—concave seats induces pressure welding between the ball and seat which is first noticed because of galling of the ball and/or seat. Galling occurs when very small areas of the ball and seat are pressure welded together and then torn apart when the ball is moved. Prototypes of this invention fail to show galling under calculated contact pressures much higher than what causes galling in valve ball—concave seats.

While not being bound by any particular theory, it is believed that the calculated contact pressures between the valve ball and seat are much higher than the real contact pressures because the valve ball and/or seat elastically deform under load thereby increasing the contact area between the ball and seat. Because contact pressure equals the force on the ball divided by the contact area between the ball and seat, increasing the contact area causes a reduction in the contact pressures. The contact area evidently increases substantially because valves made of relatively modest materials do not show plastic deformation when subjected to substantial pressures and thus substantial loads, loads which should cause plastic deformation unless some countervailing event was occurring.

Thus, in this invention high pressure ball valves with high performance metal-to-metal seals can be made of relatively modest materials without lapping. This provides the happy confluence of better performance and lower costs.

It is an object of this invention to provide an improved ball valve having a convex seat providing a metal-to-metal seal with the valve ball.

Another object of this invention is to provide an improved ball valve having a convex seat in which the seat and the valve ball are capable of performing under very high loads without galling.

A further object of this invention to provide a low cost valve ball and untapped convex valve seat which provide a suitable metal-to-metal seal.

These and other objects and advantages of this invention will become more fully apparent as this description proceeds, reference being made to the accompanying drawings and appended claims.

BRIEF DESCRIPTION OF THE DRAWINGS

FIG. 1 is a longitudinal cross-sectional view of a valve made in accordance with this invention;

FIG. 2 is an enlarged cross-sectional view of part of the valve of FIG. 1;

FIG. 3 is a further enlarged cross-sectional view of part of the valve of FIG. 1;

FIG. 4 is a side view of the upper valve seat, certain parts being broken away for clarity of illustration;

FIG. 5 is an enlarged cross-sectional view of the valve ball and ball seat at atmospheric pressure; and FIG. 6 is a view similar to FIG. 5 at high pressure.

DETAILED DESCRIPTION

Referring to FIGS. 1–4, a valve 10 is of the type shown in U.S. Pat. No. 5,246,203 the disclosure of which is incorporated herein by reference. The valve 10 is illustrated as a kelly valve used in a drill string of a rig used to drill hydrocarbon wells into the earth. Kelly valves are used in conjunction with other equipment to control a blow out. A blow out preventer (not shown) is operated to close rams around the outside of a drill string and thereby prevent uncontrolled flow of oil, gas and water on the outside of the drill string. The kelly valve 10 is incorporated in the drill string and is closed to prevent uncontrolled flow of oil, gas and/or water on the inside of the drill string. Thus, kelly valves are designed to hold substantial pressures because they are the tool of last resort to control blow outs. At the present, typical kelly valves have rated pressures of 10,000 psi and 15,000 psi. A kelly valve must have a large enough valve ball to allow tools and equipment to pass through the center of the valve ball when the valve 10 is open. Thus, a typical kelly valve has a 4½" O.D. valve ball and provides an inner passage at least at large as the I.D. of drill pipe comprising the major part of the drill string, typically 3".

The kelly valve 10 comprises a one piece housing or valve body 12 having a threaded drill pipe pin 14 at the lower end and a threaded drill pipe box 16 at the upper end. The valve body 12 provides an axial passage 18 therethrough including a relatively small lower passage section 20, a relatively large upper passage section 22 and an intermediate sized recess 24 connecting the sections 20, 22. The upper passage section 22 provides an enlarged recess 26 receiving a locking assembly (not shown). A transverse passage 28 opens into the recess 24 exposing an actuator 30 to the exterior of the valve body 12 so the valve mechanism may be manipulated.

Removably placed in the lower end of the upper passage 22 and in the recess 24 is a valve mechanism 32 comprising, as major components, a cage or carrier 34, a lower seat assembly 36, a floating valve ball 38 and an upper seat assembly 40. The valve mechanism 32 is positioned and held in the valve body 12 by the locking assembly (not shown). As will be evident to those skilled in the art, the actuator 30 cooperates with the valve ball 38 for positioning the valve ball 38 in open and closed positions, sealing against the lower and upper seat assemblies 36, 40.

The lower seat assembly 36 is of generally cylindrical shape and provides a circular ring shaped sealing area having a convex metal seat 42. The seat assembly 36 rests on top of a spring assembly 44 biasing the seat assembly 36 toward the valve ball 38. The spring assembly 44 may be of any suitable type, such as a wavy annular spring. The convex sealing surface 42 abuts the valve ball 38 in a metal-to-metal seal.

The valve ball 38 is of conventional construction having a central passage 46 and a smooth spherical exterior sealing surface 48.

The upper seat assembly 40 is of generally cylindrical shape and provides a circular ring shaped sealing area having a convex sealing surface 50 abutting the valve ball 38 in a metal-to-metal seal. The sealing surface 50 preferably has a relatively large radius of curvature, at least 75% of the radius of the valve ball 38 and preferably at least 100% of the radius of the valve ball 38, for purposes more fully explained hereinafter. The upper seat assembly 40 rigidly abuts the valve body 12, also as more fully explained hereinafter.

Rotation of the actuator 30 causes the valve ball 38 to rotate between an open position in which the valve passage 46 is aligned with the passage 18 through the valve body 12 and a closed position in which the valve passage 46 is transverse to the passage 18, as is shown in FIGS. 1–3. With the exception of the convex sealing surfaces 42, 50, the valve 10 is identical with the valve shown in U.S. Pat. No. 5,246,203 to which reference is made for a more complete description. As used herein, the upper end 16 of the valve body 12 is thought of as the downstream end, even though flow is normally from the top to the bottom of the valve body 12. The reason is that when the valve 10 is closed under serious conditions, flow is either upward from the bottom to the top, or is in danger of being so, i.e. the well being drilled is either blowing out or threatening to blow out.

There is a dramatic difference between concave and convex valve seats, particularly in the area of contact between the valve ball and the valve seat. The area of contact with a concave seat can vary, depending on the extent of the concavity in the valve seat. The area of contact with a convex seat is essentially a line. This difference has substantial repercussions as will be apparent from a comparison of Tables I and II.

Table I shows the forces and pressures calculated to be generated on a metal valve ball and a metal concave valve seat when the valve is closed under various conditions.

TABLE I

| valve ball I.D. and seat type | valve rated pressure psi | passage area sq. in | force on valve ball, # | area of contact sq. in | pressure between valve ball and seat, psi |
|---|---|---|---|---|---|
| 2", concave | 1000 | 3.142 | 3142 | 1.669 | 1,882 |
| 3", concave | 1000 | 7.069 | 7069 | 2.454 | 2,880 |
| 4", concave | 1000 | 12.566 | 12566 | 3.240 | 3,878 |
| 5", concave | 1000 | 19.635 | 19635 | 4.025 | 4,878 |
| 2", concave | 5000 | 3.142 | 15710 | 1.669 | 9,412 |
| 3", concave | 5000 | 7.069 | 35345 | 2.454 | 14,403 |
| 4", concave | 5000 | 12.566 | 62830 | 3.240 | 19,392 |
| 5", concave | 5000 | 19.635 | 98175 | 4.025 | 24,391 |
| 2", concave | 10000 | 3.142 | 31420 | 1.669 | 18,826 |
| 3", concave | 10000 | 7.069 | 70690 | 2.454 | 28,806 |
| 4", concave | 10000 | 12.566 | 125660 | 3.770 | 33,332 |
| 5", concave | 10000 | 19.635 | 196350 | 4.712 | 41,670 |
| 2", concave | 15000 | 3.142 | 47130 | 1.669 | 28,239 |
| 3", concave | 15000 | 7.069 | 106035 | 2.454 | 43,209 |
| 4", concave | 15000 | 12.566 | 188490 | 3.770 | 49,997 |
| 5", concave | 15000 | 19.635 | 294525 | 4.712 | 62,505 |

The force applied to the ball is the cross-sectional area of the ball I.D. multiplied by the pressure differential across the ball. Although the ball I.D. may sound like an unusual selection, a close analysis of the structure will show that the pressure differential acts on the ball I.D. and not the ball O.D. The contact pressure between the ball and the valve seat is the force applied to the ball divided by the area of contact between the ball and seat. The area of contact between the ball and seat is pi×(the ball I.D. plus one half the width of the sealing area)×(the width of the sealing area).

It will be appreciated, of course, that the pressure rating of any valve is a nominal value and valves meeting these pressure ratings will, in fact, withstand larger pressures, i.e. there is margin of safety built into the valve.

The area of contact between a concave valve seat and the valve ball is assumed to be ¼" wide.

It has been realized that these calculations assume something that is demonstrably not true, i.e. that the valve ball is rigid and does not deform. Concave valve balls made of high strength steel alloys subjected to high loads have been seen to plasticly deform in an roughly annular area corresponding to the I.D. of the concave seat. It is believe that the valve ball has deformed, reducing the contact area between the ball and seat, and thereby raising the contact pressure between the ball and seat. These failures have occurred at calculated contact pressures, assuming no ball deformation, much lower than the elastic limit of the materials.

It is known in the art that ball valves with concave seats gall or pressure weld when subjected to substantial pressures. Galling or pressure welding is minimized or prevented by judiciously selecting the materials, the heat treatments and the surface finish of the ball and/or seat. The rule of thumb is that a hardness of Rockwell 50C or higher on the valve ball, the seat or both, will prevent galling.

Table II shows the forces and pressures generated on a valve ball and a convex valve seat with the valve closed under various conditions.

TABLE II

| valve ball I.D. and seat type | rated pressure psi | valve ball area sq. in | force on valve ball, # | area of contact sq. in | pressure between valve ball and seat, psi |
| --- | --- | --- | --- | --- | --- |
| 2", convex | 1000 | 3.142 | 3142 | .1005 | 31,264 |
| 3", convex | 1000 | 7.069 | 7069 | .1508 | 46,877 |
| 4", convex | 1000 | 12.566 | 12566 | .2011 | 62,486 |
| 5", convex | 1000 | 19.635 | 19635 | .2513 | 78,134 |
| 2", convex | 5000 | 3.142 | 15710 | .1005 | 156,318 |
| 3", convex | 5000 | 7.069 | 35340 | .1508 | 234,350 |
| 4", convex | 5000 | 12.566 | 62830 | .2011 | 312,432 |
| 5", convex | 5000 | 19.635 | 98175 | .2513 | 390,669 |
| 2", convex | 10000 | 3.142 | 31420 | .1005 | 312,637 |
| 3", convex | 10000 | 7.069 | 70690 | .1508 | 468,767 |
| 4", convex | 10000 | 12.566 | 125660 | .2011 | 624,863 |
| 5", convex | 10000 | 19.635 | 196350 | .2513 | 781,337 |
| 2", convex | 15000 | 3.142 | 47130 | .1005 | 468,955 |
| 3", convex | 15000 | 7.069 | 106035 | .1508 | 703,150 |
| 4", convex | 15000 | 12.566 | 188490 | .2011 | 937,295 |
| 5", convex | 15000 | 19.635 | 294525 | .2513 | 1,172,006 |

These calculations are based on the following assumptions: the area of contact between a convex valve seat and the valve ball is an annulus having a central diameter of 110% of the I.D. of the ball and is 0.02" wide.

These values are very large and, in the main, are above the compressive elastic limit of most steel alloys. The elastic limit of metals, in tension, is much better known than the elastic limit in compression. It is believed, however, that the elastic limit in compression is on the order of about 20% greater than the elastic limit in tension.

Several models of this invention have been made and tested. The first model had a 2¼" I.D. and the second had a 3 5/64" I.D. The valve ball of the first model was made of 17-4PH stainless with a heat treatment of H900 having a hardness of Rockwell 44C. The valve ball of the second model was made of 17-4PH stainless with a heat treatment of H900 having a hardness of Rockwell 44C. Both were subjected to pressures of 15,000 psi. This should have resulted in plastic deformation of the valve ball and/or seat because the compressive elastic limit of the material is on the order of about 250,000 psi and the calculated stresses on the models were well above this value, as seen in Table II. A close inspection of the valve balls and seats showed no failure, i.e. no plastic deformation of the ball or seat. This was surprising because the valve ball or seat should have shown plastic deformation of the materials from which they were made.

It will thus be seen that the area of contact between a valve ball and its associated convex seat is very small. This causes high contact pressures between the valve ball and the valve seat, even with small diameter valves at modest pressures. It will be seen that the contact pressure increases by the ratio of the contact areas, which in the assumptions made in Tables I and II, is 16.6.

At high contact pressures, pressure welding of the valve ball and valve seat should occur. Pressure welding is first evidenced by galling of the valve ball and/or valve seat. Galling occurs when small areas of the ball and seat are pressure welded together and then torn apart when the ball is moved. The pressure necessary to achieve pressure welding varies depending on the composition of the ball and seat, temperature and a number of other factors but should be very quickly reached with valve balls and convex seats because of the very small contact area between them.

The valve 10 should be impractical or inoperable for high pressure uses because the valve ball and convex seat should be pressure welded, seriously galled or plasticly deformed at the rated pressures of kelly valves. Instead, the tested models show that no galling, pressure welding or plastic deformation occurs at loads that should create plastic deformation of the valve ball or valve seat. Without being bound by any particular theory, it is believed that the convex faces of the valve ball and/or valve seat deform under load to increase the contact area between them. Because of the geometry of the contact between the valve ball and seat, the contact area increases sufficiently to keep the contact pressure below the elastic limit of the materials used. The concept may be visualized by pressing two balloons together. As the force pressing the balloons together increases, the contact area between the balloons increases. This keeps the contact pressure below the elastic limit of the material.

This is shown by a comparison of FIGS. 5 and 6. FIG. 5 shows the relationship of the ball 38 and seat 50 at atmospheric pressures so the contact area 52 is quite small, i.e. on the order of the calculations in Table II. FIG. 6 shows the relationship of the ball 38 and seat 50 at a pressure of 10–15,000 psi. The metals of the ball 38 and seat 50 are believed to elastically deform at the junction to increase the contact area 52 and thereby reduce the contact pressure between the ball 38 and seat 50.

It will be appreciated that the lower valve seat 36 is not subject to maximum pressures because it is sealing pressure from above and thus preferably has a spring 44 acting against it to keep all of the components in contact. It is the upper valve seat 40 that is subject to blow out pressures and thus must withstand maximum pressures and loads. Accordingly, the upper valve seat 40 is convex and rigid with the valve body 12.

The valve ball 38 and the upper valve seat 40 are preferably made of steel alloys that are typical in the manufacture of high pressure valves. In a preferred technique, the valve ball 38 and the valve seat 40 are made of metals selected to minimize galling or pressure welding problems. Preferably, the ball 38 is made of stainless steel to avoid corrosion problems and has a Rockwell hardness above 44C or higher. Preferably, the valve seat 40 is made of Stellite or some other suitably hard metal having a Rockwell hardness above 50C.

Prototype valves using balls 38 and convex seats 36, 40 have been tested to rated pressures in the range of 10,000–15,000 psi and do not pressure weld or gall. Because the balls 38 and seats 40 do not have to be lapped, they are of lower cost than lapped concave valve seat arrangements and still provide metal-to-metal seals.

In an alternate embodiment, the valve ball 38 and convex seats 36, 40 may be made of materials of comparable hardness provided they are sufficiently hard. In this alterative, the valve ball 38 and seats 36, 40 should be above Rockwell hardness 50C.

The valve 10 of this invention has high performance metal-to-metal seals and is considerably less expensive to make than prior art concave metal-to-metal seals because is does not have to be lapped. Although this construction appear, at first blush, to generate contact pressures above the elastic limit of the metals from which the valve is made, the valve ball and/or seat are evidently elastically deformed to increase the contact area and thereby maintain stresses below the elastic limit of the metals from which the valve ball and seat are made.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

What is claimed is:

1. A valve comprising
   a valve body having a conduit extending therethrough for delivering fluid from a first end toward a second end;
   a valve ball providing a spherical segment mounted in the valve body for rotation between flow permitting and flow blocking positions for controlling flow through the conduit, and
   a convex metal valve seat rigidly abutting the valve body at least against the second end and sealingly engaging the spherical segment of the valve ball along a circle for sealing against fluid flow through the valve upon rotation of the valve ball to the flow blocking position.

2. The valve of claim 1 wherein the valve ball and the valve seat are unlapped.

3. The valve of claim 2 wherein the valve ball is made of a steel having a hardness of at least Rockwell 44C and the valve seat is made of a material having a hardness of at least Rockwell 50C for minimizing galling.

4. The valve of claim 3 wherein the metal seat is Stellite.

5. The valve of claim 4 wherein the valve ball is of stainless steel having a hardness of at least Rockwell 44C and the Stellite valve seat has a hardness of at least Rockwell 50C.

6. The valve of claim 1 wherein the valve ball and the metal seat have comparable hardnesses of at least Rockwell 50C.

7. The valve of claim 1 further comprising a second convex metal valve seat sealingly engaging the spherical segment of the valve ball along a circle for sealing against fluid flow through the valve upon rotation of the valve ball to the flow blocking position and means resiliently forcing the second valve seat against the valve ball.

8. The valve of claim 1 wherein the convex valve seat has a radius of curvature of at least 75% of a radius of the valve ball.

9. The valve of claim 1 further comprising a spring between the valve body and the convex seat operating to bias the convex seat toward the second end of the valve body.

10. The valve of claim l wherein the first end of the valve body is an upstream end and the second end is a downstream end.

11. In combination, a valve ball providing a spherical segment mounted for rotation between flow permitting and flow blocking positions for controlling flow, the valve ball being made of a steel alloy having a hardness of at least Rockwell 44C; and
    a convex unlapped metal seat abutting and sealingly engaging the spherical segment of the valve ball along a circle for sealing against fluid flow upon rotation of the valve ball to the flow blocking position, the seat being made of a material having a hardness of at least Rockwell 44C.

12. The valve of claim 11 wherein the metal seat is Stellite.

13. The valve of claim 11 wherein the valve ball is of stainless steel having a hardness of at least Rockwell 44C and the valve seat has a hardness of at least Rockwell 50C.

14. The valve of claim 11 wherein the valve ball and the metal seat have comparable hardnesses of at least Rockwell 50C.

15. The valve of claim 11 wherein the convex valve seat has a radius of curvature of at least 75% of a radius of the valve ball.

16. In combination, a valve ball providing a spherical segment mounted for rotation between flow permitting and flow blocking positions for controlling flow; and a convex seat abutting and sealingly engaging the spherical segment of the valve ball along a circle for sealing against fluid flow upon rotation of the valve ball to the flow blocking position, the seat and valve ball abutting on a predetermined contact area under no load, being made of materials having predetermined first and second compressive elastic limits and having a pressure rating sufficient to produce a calculated contact pressure between the valve ball and seat above at least one of the first and second compressive elastic limits, the geometry of the valve ball and convex seat acting to increase the contact area under load and thereby maintain the valve ball and seat below the first and second compressive elastic limits at the pressure rating.

17. The combination of claim 16 wherein the valve ball is a steel alloy having a hardness of at least Rockwell 44C and the seat ring is a metal alloy having a hardness of at least Rockwell 50C.

18. The combination of claim 16 wherein the valve ball and the seat ring are steel alloys having comparable hardnesses of at least Rockwell 50C.

19. The combination of claim 16 wherein the valve ball and valve seat are untapped.

20. The valve of claim 16 wherein the convex valve seat has a radius of curvature of at least 75% of a radius of the valve ball.

21. A valve having a rated fluid pressure, comprising
    a valve body having a conduit extending therethrough for delivering fluid from a first end toward a second end;
    a first valve member comprising a valve ball providing a spherical segment mounted in the valve body for rotation between flow permitting and flow blocking positions for controlling flow through the conduit,
    a second valve member comprising a convex valve seat ring mounted in the valve body for sealingly engaging the spherical segment of the valve ball along an annulus of predetermined area, at atmospheric pressure, for sealing against fluid flow through the valve upon rotation of the valve ball to the flow blocking position, the rated fluid pressure divided by the predetermined area of the annulus valve ball and valve seat providing a contact pressure of at least 300,000 psi, the valve ball and valve seat being made of metals plasticly deforming at less than the contact pressure, the valve ball being movable between the flow blocking and flow allowing positions at the rated pressure without inelastically deforming either valve member by elastically deforming at the rated pressure to increase the area of the annulus and thereby decrease the contact pressure between the valve ball and valve seat below the elastic limit of the metals.

22. The valve of claim 21 wherein the rated fluid pressure is at least 10,000 and the valve ball has an inner diameter of at least 2 inches.

23. The valve of claim 21 wherein the surface hardness of the valve ball and the valve seat are at least Rockwell 44C.

24. The valve of claim 21 wherein the convex valve seat has a radius of curvature of at least 75% of a radius of the valve ball.

25. A method of operating a valve comprising a valve body having a conduit extending therethrough for delivering fluid from an upstream end toward a downstream end; a valve ball providing a spherical segment mounted in the valve body for rotation between flow permitting and flow blocking positions for controlling flow through the conduit, and a convex metal valve seat rigidly abutting the valve body sealingly engaging the spherical segment of the valve ball along a circle for sealing against fluid flow through the valve upon rotation of the valve ball to the flow blocking position, the valve ball and seat abutting in a predetermined contact area at atmospheric pressure, comprising the steps of subjecting the valve to a pressure of at least 5,000 psi and elastically deforming the ball valve and seat to increase the contact area above the predetermined contact area.

* * * * *